US012790115B2

(12) United States Patent
Burmeister et al.

(10) Patent No.: US 12,790,115 B2
(45) Date of Patent: Nov. 10, 2026

(54) CHANGING AREA FOR SPAS, INDOOR SWIMMING POOLS, OUTDOOR SWIMMING POOLS, FITNESS CENTERS AND THE LIKE

(71) Applicant: Delta-X GmbH Ingenieurgesellschaft, Stuttgart (DE)

(72) Inventors: Albrecht Burmeister, Weissach im Tal (DE); Walter Klas, Neukirch (DE); Lucas Leuschner, Munich (DE); Cosmin Marginean, Cisnadie (RO)

(73) Assignee: Delta-X GmbH Ingenieurgesellschaft, Stuttgart (DE)

( * ) Notice: Subject to any disclaimer, the term of this patent is extended or adjusted under 35 U.S.C. 154(b) by 291 days.

(21) Appl. No.: 18/684,271

(22) PCT Filed: Aug. 12, 2022

(86) PCT No.: PCT/EP2022/072704
§ 371 (c)(1),
(2) Date: Feb. 16, 2024

(87) PCT Pub. No.: WO2023/020972
PCT Pub. Date: Feb. 23, 2023

(65) Prior Publication Data

US 2024/0270490 A1 Aug. 15, 2024

(30) Foreign Application Priority Data

Aug. 17, 2021 (DE) ..................... 10 2021 121 356.8

(51) Int. Cl.
*B65G 1/04* (2006.01)

(52) U.S. Cl.
CPC .... *B65G 1/0457* (2013.01); *B65G 2201/0229* (2013.01)

(58) Field of Classification Search
CPC ...... B65G 1/0457; B65G 1/0485; B65G 1/06; B65G 1/137; B65G 2201/0229;
(Continued)

(56) References Cited

U.S. PATENT DOCUMENTS 4,789,293 A * 12/1988 Hashimoto .......... B65G 1/1371
700/214
10,424,143 B2 * 9/2019 Miller ................ G07C 9/00912
(Continued)

FOREIGN PATENT DOCUMENTS

CN 104484914 A * 4/2015
CN 205259795 U * 5/2016
(Continued)

OTHER PUBLICATIONS

Translated German Examination Report, Application No. 102021121356.8, dated May 13, 2022, pp. 1-14.
(Continued)

*Primary Examiner* — Jacob S. Scott
*Assistant Examiner* — Temesgen M. Maru
(74) *Attorney, Agent, or Firm* — BOND, SCHOENECK & KING, PLLC; George R. McGuire

(57) ABSTRACT

The invention relates to a changing area for spas, indoor or outdoor swimming pools, fitness amenities but also changing areas of factories, wherein a storage box is automatically assigned to a user and the storage box is transported to the changing cubicle occupied by the user.

20 Claims, 14 Drawing Sheets

(58) Field of Classification Search

CPC ......... B65G 2201/0258; G06Q 20/403; G06Q 30/0645; G07F 11/56; G07F 11/60; G07F 17/12; E04H 1/12; E04H 1/1266; E05G 1/06

See application file for complete search history.

(56) References Cited

U.S. PATENT DOCUMENTS

| | | | | |
|---|---|---|---|---|
| 2018/0265298 | A1* | 9/2018 | Wagner | B66F 9/063 |
| 2021/0206001 | A1* | 7/2021 | Lee | B65G 1/137 |
| 2025/0128883 | A1* | 4/2025 | O'Brien | B65G 1/04 |

FOREIGN PATENT DOCUMENTS

| | | | | | |
|---|---|---|---|---|---|
| CN | 108945935 | A | * | 12/2018 | E05G 1/00 |
| DE | 1813408 | A1 | | 7/1970 | |
| DE | 20001122 | U1 | | 8/2000 | |
| DE | 102015106923 | A | | 1/2016 | |
| EP | 0492471 | A1 | * | 7/1992 | E05G 1/06 |
| JP | S63165047 | U | | 10/1988 | |
| JP | H0733719 | B2 | | 4/1995 | |
| JP | H07107718 | B2 | * | 11/1995 | |
| JP | H08128235 | A | * | 5/1996 | |
| JP | 2010159570 | A | * | 7/2010 | |
| JP | 2021091028 | A | | 6/2021 | |
| KR | 20130041626 | A | | 4/2013 | |
| KR | 101512817 | B1 | | 4/2015 | |
| WO | 2023020972 | A1 | | 2/2023 | |

OTHER PUBLICATIONS

Translated International Search Report, Application No. PCT/EP2022/072704, prepared Nov. 18, 2022, mailed Nov. 25, 2022, pp. 1-5.

UAE Search Report; Application No. P6000333/2024; Dated Apr. 14, 2026, Entire document.

UAE Office Action Summary; Application No. P6000333/2024; Dated Apr. 14, 2026, Entire document.

UAE Office Action; Application No. P6000333/2024; Dated Apr. 17, 2026, Entire Document.

KR Notice of Grounds for Rejection, Application No. 10-2024-7007330, dated Jul. 29, 2026, entire document.

* cited by examiner

CHANGING AREA FOR SPAS, INDOOR SWIMMING POOLS, OUTDOOR SWIMMING POOLS, FITNESS CENTERS AND THE LIKE

CROSS-REFERENCE TO RELATED APPLICATION

The present application is the United States National Stage Application, filed under 37 U.S.C. 371, of International Patent Application No. PCT/EP2022/072704, filed on Aug. 12, 2022, which claims priority to German Patent Application 10 2021 121 356.8 filed Aug. 17, 2021, the entire contents of each of which is hereby incorporated by reference.

The invention relates to the changing areas of spas, public swimming pools (outdoor or indoor pools), commercial fitness studios, but also to the changing areas of industrial plants where workers change their clothes before starting work, exchanging their street clothes for their work clothes.

For many decades, a system has been established in such changing areas that is very static, offers little comfort, and requires a large amount of space: there are changing cubicles in which the user changes clothes. Here, the user takes off their everyday clothes and puts on swimming trunks, a swimsuit, sportswear, or workwear, for example. The stored everyday clothes are hung on a hanger and locked in a locker. The locker is not located in the changing cubicle, but at another location. The user takes the key to this locker along with them.

When they want to leave the spa or their workplace, they first go to the locker, take out the hanger with the clothes hanging on it, and go to a free changing cubicle.

This system is not very user-friendly, because the user has to go to two places every time they want to change: the changing cubicle and the place where the lockers are located.

In large changing areas, this leads to many users moving around in the corridors and hallways between the changing cubicles and lockers. This “pedestrian traffic” requires wide aisles and corridors. That is, the space requirement is considerable. However, it also increases the number of contacts between users. These contacts are undesirable because they contribute to the transmission of infections, whether it be colds, flu, or the coronavirus.

The invention is based upon the object of providing a changing area that is more user-friendly and appealing, that causes less pedestrian traffic in the aisles and corridors of the changing area, and that also requires less space relative to the number of users.

According to the invention, this object is achieved by a changing area comprising several changing cubicles and at least one storage and retrieval system, wherein each changing cubicle comprises several walls and a door, wherein a shelf system for storage boxes is arranged on an outer side of a wall, wherein several storage locations for storage boxes are arranged side-by-side and one above the other in the shelf system and form a grid, wherein a wall of the changing cubicle has an opening, and wherein this opening exposes a storage location for a storage box in the shelf system located outside the changing cubicle.

The changing cubicle according to the invention, like other changing cubicles, generally has four walls. One of the walls has a door through which the user can enter the inside of the changing cubicle. There is an opening in one wall of the changing cubicle. This wall is usually the wall opposite the door.

In connection with the invention, the walls of the changing cubicle that are seen by the user in the changing cubicle are referred to as the “inner walls” of the changing cubicle. The rear side or outside of these walls are therefore referred to as the outside of a wall of a changing cubicle.

In accordance with the invention, it is provided that a shelf storage system be arranged on the outside of the wall in which the opening is located. There are a large number of storage locations in this shelf system. A storage box can be stored in each of these storage locations. The user inside the cubicle sees nothing of the shelf system.

The opening in the wall of the changing cubicle is dimensioned and positioned such that it provides access from inside the changing cubicle to a storage location in the shelf system. In other words, a user who is located in the changing cubicle has access to the interior or the content of a storage box which is located behind the opening in the storage location of the shelf system. This means that the user can fill the storage box in the opening with their clothes or other items. They can remove the clothes or articles from the storage box at a later time.

After the user has changed and wants to leave the changing cubicle, this storage box is removed from this storage location and is stored in another storage location in this shelf system or the shelf system on the outside of another changing cubicle. As a result, the opening and the storage location behind the opening become free.

The users in the changing cubicles do not have access to the storage boxes stored in the other storage locations. The only exception is the storage boxes that are located in a storage location “behind” the opening in the wall of a changing cubicle.

The arrangement according to the invention makes it possible that, shortly after a user has selected a changing cubicle, e.g., by opening the door and entering it, the storage box assigned to this user be removed from its storage location in the shelf system and brought to the storage location of the shelf system which is located behind the opening in the changing cubicle selected by the user.

The user can open, fill, or empty the storage box assigned to them and can then change their clothes. As soon as the user leaves the changing cubicle again or indicates by another signal that the changing process is complete, the storage box assigned to the user is removed by the storage and retrieval system from the storage location behind the opening and is stored in another storage location that is not accessible from the inside of a changing cubicle.

The changing cubicle is thus available again for another user. At the latest, when this other user enters the changing cubicle, the storage box assigned to them is moved to the storage location behind the opening with the aid of the storage and retrieval system, so that the other user can change.

This changing cubicle according to the invention therefore makes it possible for each user to always have access to the (“their”) storage box assigned to them when they are in a changing cubicle. They also do not have to subsequently lock the storage box in a locker that is located at some distance from the changing cubicle. This is done by the storage and retrieval system.

This significantly increases convenience for the users, since there is no “unnecessary” distance between the changing cubicle and locker or between the locker and changing cubicle. This saves upon a large number of footpaths in the changing area and, as a result, the traffic areas for users can also be made correspondingly smaller.

Another benefit in terms of convenience and user-friendliness that should not be underestimated is the fact that users do not have to remember where or in which locker they have stored their items.

The user is completely free in their choice of changing cubicle; "their" storage box is automatically stored temporarily in a free storage location in a rack storage system on the outside of an arbitrary changing cubicle. If the user goes to a different changing cubicle after visiting the spa, the storage box assigned to them will be taken to the storage location behind the opening in their cubicle immediately after they enter the cubicle. The user can change clothes and while doing so has access to the items in "their" storage box.

Another advantage of this design is that it makes it easier to clean the changing cubicles and storage boxes. It is possible to automatically clean and/or disinfect the storage boxes when they are empty. This effectively prevents the spread of germs or viruses via the storage boxes.

Because there are no locker areas accessible to the public, not only is space/traffic area saved, but the cleaning and maintenance of these traffic areas is also eliminated.

In addition, there are a variety of possible functionalities that result from the individual assignment between a user and a storage box. For example, whenever a user wants to leave the changing area or the spa and/or the facility, it can automatically be checked whether the storage box assigned to the user is empty.

If there is still an item in the storage box, the user can be informed of this when leaving the facility, and the item can be handed over to them. This is another major benefit and gain in convenience for the user of the changing area according to the invention.

In a preferred embodiment, the shelf system is arranged in the form of a grid, wherein "m" storage locations are arranged next to each other, and "n" storage locations are arranged one above the other.

For example, if five (5) storage locations are arranged next to each other and four (4) storage locations are arranged one above the other, then the shelf system has a total of 20 storage locations. One of these storage locations is assigned to the opening in the wall of the changing cubicle, leaving 19 storage locations that cannot be accessed by users of the changing area and that can be used as theft-proof temporary storage for storage boxes.

Many commercially available storage and retrieval systems can be used as the storage and retrieval system. A technology has become established commercially for goods logistics—in particular, for high-bay warehouses or shelving systems for small parts—which can also be used in accordance with the invention in changing cubicles or the changing area of a spa.

In a further advantageous embodiment of the invention, several changing cubicles are arranged in a circle and/or in the shape of a circular arc. This results in an attractive, user-friendly, and space-saving arrangement of the changing cubicles. In addition, sufficiently many storage locations are also provided in the shelf systems on the outside of the changing cubicles.

In order to be able to easily adapt the capacity of the changing area according to the invention to demand, changing cubicles in the center of a changing area are preferably arranged in the form of an (inner) circle. Several circular arcs with changing cubicles are arranged concentrically on a middle diameter and/or an outer diameter.

Traffic areas or corridors are provided between the changing cubicles arranged in a circle and the changing cubicles arranged in the form of arcs of a circle. Users can easily reach the doors to the changing cubicles via these traffic areas.

In an advantageous embodiment, it is provided that the changing cubicles which lie on an inner circle be arranged in such a way that the doors are arranged in the radially outer walls and the shelf systems are arranged on the radially inner walls, so that the shelf systems also form a circle or a polygon.

In an advantageous embodiment of the invention, a first storage and retrieval system is provided inside the changing cubicle, which is arranged on an inner circle.

Concentrically to the circularly-arranged changing cubicles, further changing cubicles are arranged next to one another in the shape of circular arcs. The diameter of these circular arcs is referred to as the middle diameter. The doors of the changing cubicles arranged on the middle diameter are provided in the radially inward-facing walls of the changing cubicles. Accordingly, the shelf systems of these changing cubicles are arranged on a radially outer wall of these changing cubicles.

As a result, there are doors on both walls of a corridor between circularly-arranged changing cubicles and the changing cubicles arranged concentrically thereto. This improves space utilization and reduces the need for traffic areas.

If the capacity of the changing area according to the invention is to be further increased, it is advantageous if further changing cubicles are arranged in the form of circular arcs on an outer diameter. These changing cubicles are preferably aligned so that the walls with the shelf systems face radially inwards, and the doors of the changing cubicles are arranged in the outward-facing walls.

This means that the shelf systems of the changing cubicles on the middle diameter and the shelf systems of the changing cubicles on the outer diameter are in immediate proximity to one another; they are separated only by a narrow circular aisle. A second storage and retrieval system can be installed in this aisle, which can serve the shelf systems on both sides of this aisle. This shortens the average distance required to transport a storage box from its storage location in one of the shelf systems to the opening of the changing cubicle where the user assigned to it is located. It also improves capacity utilization and increases the transport capacity of a second storage and retrieval system used there.

For example, if changing cubicles are arranged next to each other on four circular arcs with a middle diameter and on four circular arcs with an outer diameter, then it is generally advantageous if four (4) second storage and retrieval systems are provided.

In a further advantageous embodiment of the invention, a horizontal conveyor device is provided above the second storage and retrieval systems in order to enable the transfer of storage boxes from the shelf systems of different circular arcs. The horizontal conveyor device is preferably movable on a closed track and can accept a storage box from a second storage and retrieval system and deliver this storage box to a second storage and retrieval system on another circular arc.

The horizontal conveyor system arranged above the storage and retrieval systems bridges the access paths running in the radial direction, along which the users walk into the changing cubicles, so that storage boxes can be exchanged between the shelf systems of different circular arcs without disturbing the users of the changing area according to the invention.

The flexibility of the changing area according to the invention is further increased if, in addition, at least one radial transport device is provided, wherein each radial transport device can accept a storage box from a storage and retrieval system and deliver it to a storage and retrieval system on a different diameter. For example, the radial transport device can accept a storage box picked up by the first storage and retrieval system, move it radially outwards, and transfer it to a second radial storage and retrieval system. Of course, the reverse path is also possible.

It is also possible for the radial transport device to accept a storage box from a horizontal conveyor device and deliver it to a storage and retrieval system on a different diameter. Of course, the reverse path is also possible.

Through the horizontal conveyor device and/or the radial transport devices, any storage location in any shelf system can be used as temporary storage for a storage box. The transportation or exchange of storage boxes between the storage areas changing cubicles arranged in the form of a circular arc and the changing cubicles arranged in a circle is guaranteed in any case.

In order to ensure scalability of the changing area according to the invention, two or three changing areas according to one of the preceding claims can be set up next to each other on the same level and linked to each other via one, two, or three radial transport devices in such a way that the storage boxes can be transported back and forth between the changing areas.

This design can also be scaled in the vertical direction by arranging several changing areas one above the other. In this case, one, or preferably several, vertical conveying devices are also provided, which connect the radial transport devices on different levels with each other. Storage boxes can then be transported vertically back and forth between different levels.

The advantages named above are also realized by a method for operating a changing area comprising several changing cubicles and storage boxes, wherein each changing cubicle comprises several walls, wherein there is an opening in a wall of each changing cubicle, and wherein the dimensions of the opening and the dimensions of the storage boxes are matched to one another in such a way that a storage box located in the opening can be loaded or emptied from the changing cubicle. The method comprises the selection by a user of an (unoccupied) changing cubicle and transporting a storage box assigned to the user into the opening of the changing cubicle selected by the user.

Ideally, this means that, when the user enters the changing cubicle they selected, the storage box assigned to the user is already in the opening in the wall of the changing cubicle that the user enters.

The selection of a changing cubicle by the user can in one case take place quite conventionally in that the user opens the door of an unoccupied ("free") changing cubicle. If the user then identifies themselves, whether by entering a PIN (personal identification number) or a fingerprint, or automatically via NFC (near field communication), the assignment between the user and the changing cubicle the user has entered is then established.

If the user is carrying an admission ticket with an RFID chip, entering the changing cubicle can be automatically recognized by reading the identification number from the RFID chip.

The storage box assigned to the user is then transported fully automatically to the storage location located behind the opening in the wall of the changing cubicle selected by the user.

It is of course also possible that, already upon entering the facility, i.e., when the user receives their ticket, first, a changing cubicle that is currently free is reserved and assigned to the user, and, while the user is walking from the entrance area to the changing cubicle assigned to them, the storage box assigned to them is transported into the opening in the wall of the changing cubicle that is reserved for the user.

This type of assignment usually takes place only when the user enters the facility for the first time on a given day. That is, the user is then in the sales counter area.

During the day, if the user wants, for example, to change clothes or access personal items in their storage box, a changing cubicle can be selected by pressing the door handle of an unoccupied changing cubicle.

As soon as the user leaves the changing cubicle, the storage box assigned to them is removed from the opening of the changing cubicle they are using and transported to another storage location. This other storage location is not positioned behind an opening in a wall of a changing cubicle. That is, the storage box is temporarily stored at a storage location that cannot be accessed by the users of the spa. This ensures that no unauthorized persons have access to the contents of this storage box. It is thus not even necessary to lock the storage box. It is sufficient if a door of the storage box is secured against unintentional opening by, for example, a magnetic closure or a simple latching mechanism.

As soon as the storage box assigned to the last user of a changing cubicle has been removed from the storage location behind the opening of this changing cubicle, the changing cubicle is then accessible again for other users. At the latest when another user enters the changing cubicle, the storage box assigned to the other user is placed into the opening in the wall of this changing cubicle.

It is also possible for the user to not be assigned a storage box until they enter an empty changing cubicle for the first time after entering the facility. An empty storage box is then transported into the opening of this cubicle, and the assignment between the identification number and the user card and an RFID chip or storage box is established.

In a further advantageous embodiment of the invention, the assignment between a storage box and a user can be canceled when leaving the facility, for example. However, in an advantageous embodiment of the method, a check is first carried out as to whether the storage box is actually empty. If there are still items in the storage box, a corresponding message is sent to the user or to the operator of the facility, so that the user can still collect their "forgotten" items or take them with them before leaving the facility.

It can also be helpful to store the assignments for a period of, for example, five days. In the event that a user reports the loss of an item only after leaving the facility, the storage box assigned to the user can be identified and checked by staff.

Further advantages and advantageous embodiments of the invention can be found in the following drawing, the description, and the claims. All the features disclosed in the drawings and the description can be essential to the invention both individually and in any combination.

DESCRIPTION OF THE EXEMPLARY EMBODIMENTS

Figure 1:
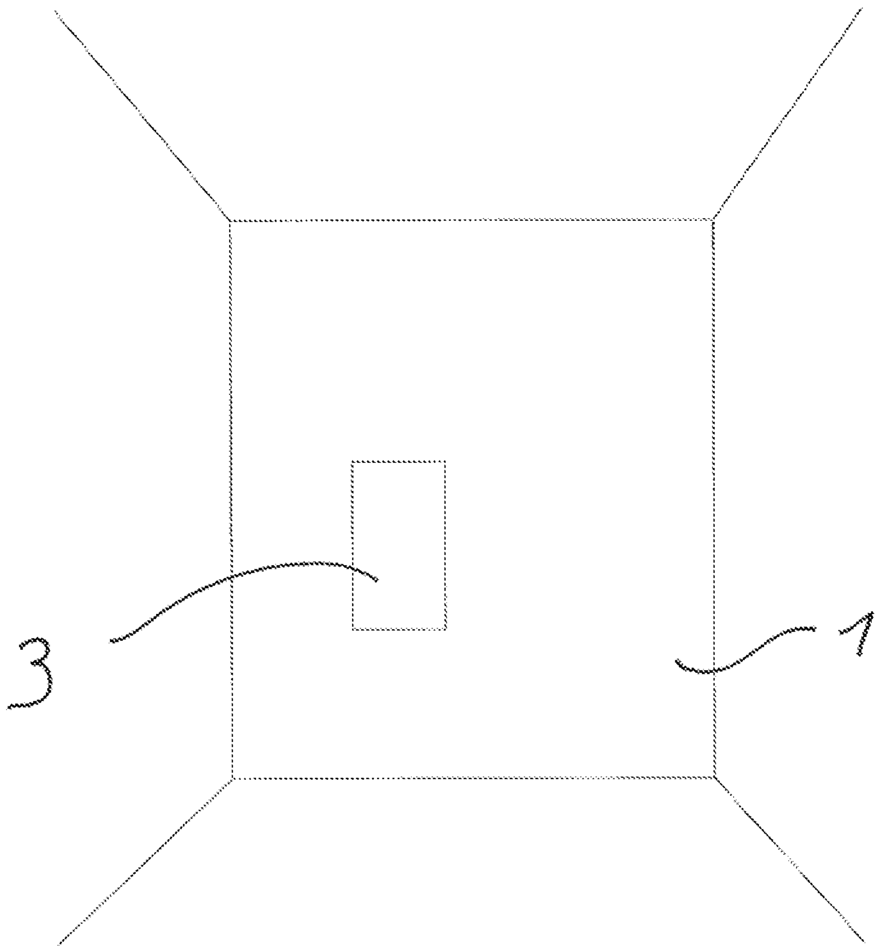
FIG. 1 shows a view of the inside of a changing cubicle according to the invention.

FIG. 1 shows a wall 1 of a changing cubicle according to the invention. The side walls, floor, and ceiling of the changing cubicle are only partially shown and are not given reference signs. The wall in which there is an entrance door is not shown.

Wall 1 is the wall opposite the entrance door (not shown) of the changing cubicle. It can therefore also be referred to as the rear wall. There is an opening 3 in the wall 1. This opening 3 can be closed with a flap or a slide (not shown), or can be opened as needed.

Figure 2:
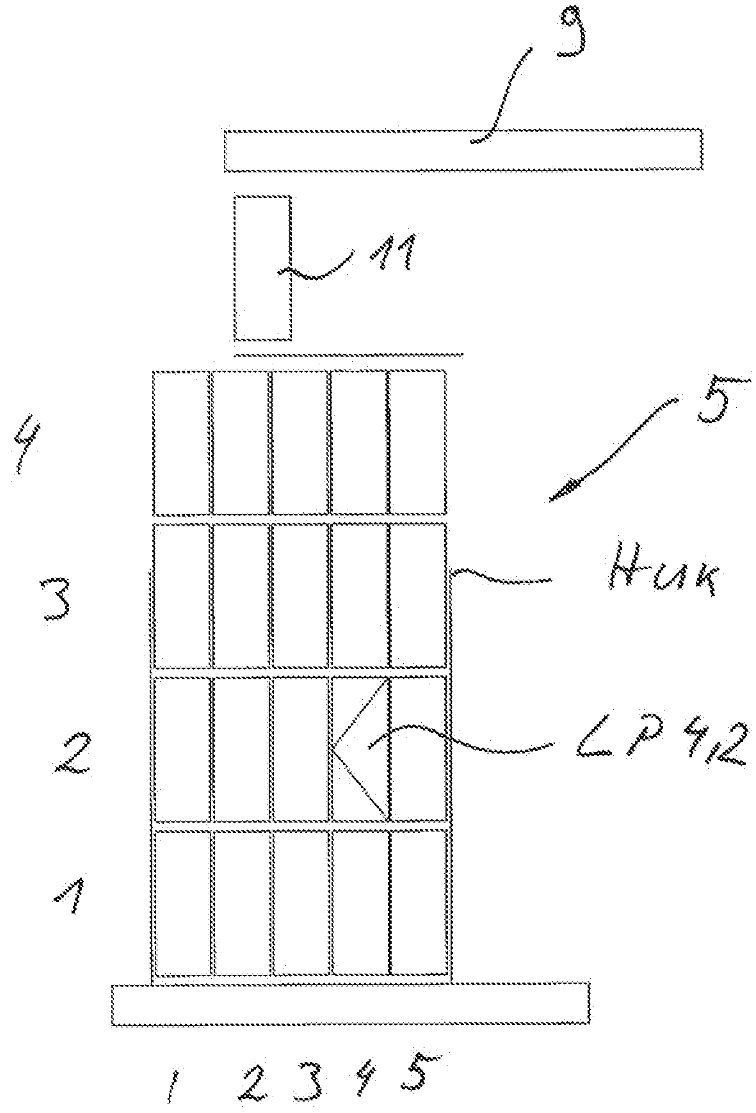
FIG. 2 shows the exterior view of the wall of FIG. 1 with a shelf system arranged in front of it.

In the changing cubicle according to the invention, behind the wall 1, i.e., outside the changing cubicle, there is arranged a shelf system as shown in FIG. 2.

FIG. 2 shows an external view of the wall 1 shown in FIG. 1. In FIG. 2, the wall 1 is largely concealed by the aforementioned shelf system. In this exemplary embodiment, this shelf system has four levels stacked vertically one over the other and five columns arranged next to each other. The rack storage system therefore has a total of twenty storage locations (the number of storage locations is the product of the number of columns (m=5) and the number of rows arranged one above the other (n=4)).

If the storage locations LP are numbered according to the running indices, then the storage location LP 4,2 is positioned so that it is behind the opening 3 (see FIG. 1). A flap (which does not have a reference sign) arranged in front of the opening 3 is shown in FIG. 2.

If there is a storage box (not shown) in storage location LP 4,2, the user of the changing cubicle can access the contents of the storage box located in storage location LP 4,2 through opening 3. The user can fill it or remove objects from it.

The other nineteen (19) storage locations are not accessible to the user inside the changing cubicle because wall 1 has only one opening 3, which provides access to exactly one storage location (here, LP 4,2) from inside the changing cubicle.

FIG. 2 also shows that the shelf system 5 behind the wall 1 of the changing cubicle is significantly higher than the changing cubicle. The height HUK of the changing cubicle and the height HLR of shelf system 5 are shown in FIG. 2.

An optional intermediate ceiling 7 is installed above the shelf system 5, which ensures that a transport level above the shelf system 5 is spatially separated from the user area. This reduces the risk of accidents and gives the changing area a more attractive appearance.

Above the intermediate ceiling 7 is a transport level with a horizontal conveyor device 9, which is only shown schematically. The horizontal conveyor device 9 is used to transport storage boxes 11, only one of which is shown in FIG. 1.

Figure 3:
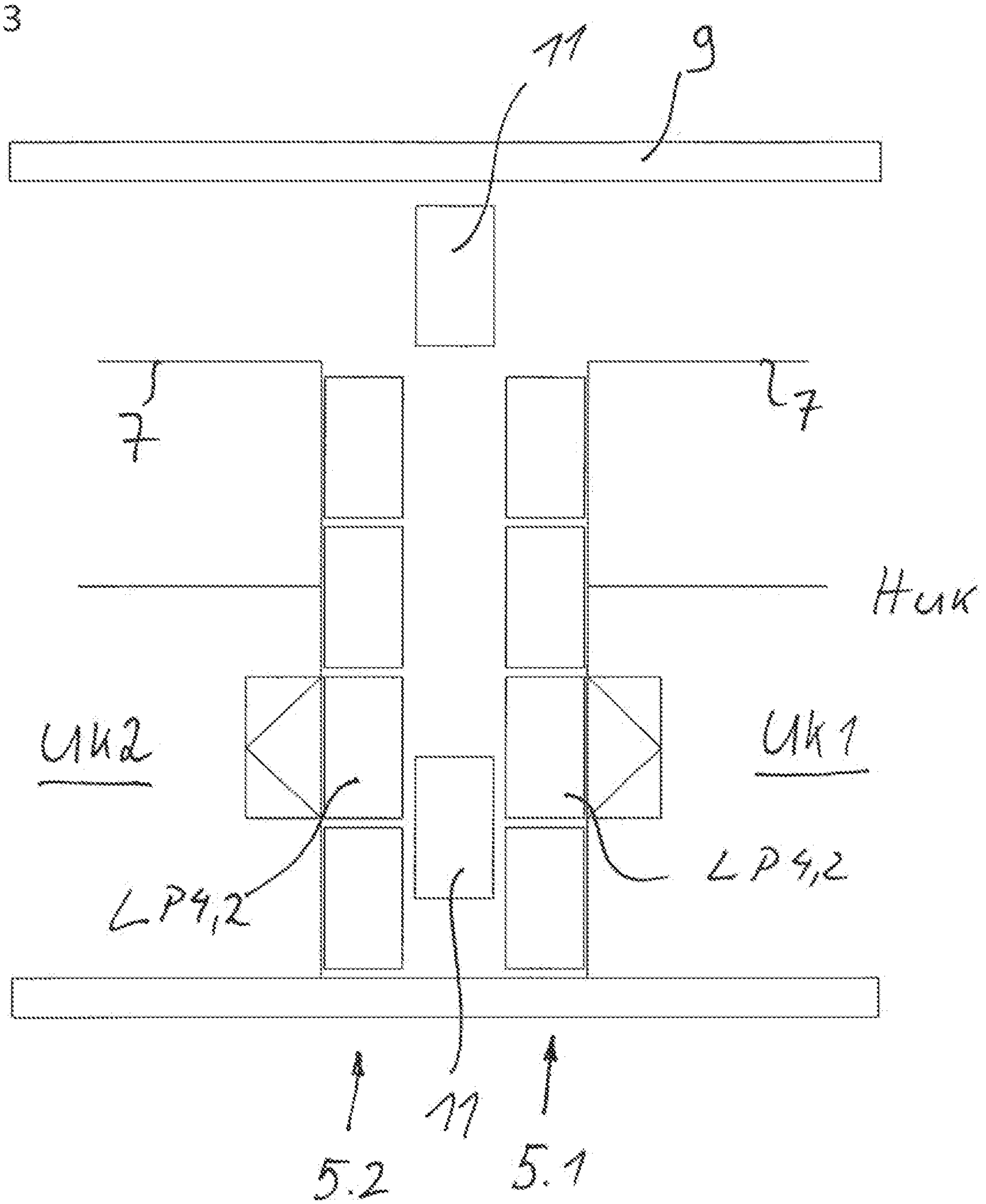
FIG. 3 shows a side view of two changing cubicles, two shelf systems, and a corridor between them with a storage and retrieval system.

FIG. 3 shows a side view of two changing cubicles UK1 and UK2. The walls 1 with the openings 3 of the changing cubicles UK1 and UK2 are aligned facing each other, so that two shelving systems 5 are arranged between the walls 1 of the two changing cubicles. There is a (walking) aisle 13 between the shelf systems 5, which is dimensioned so that a storage and retrieval system (not shown) and a storage box 11 can travel back and forth in it.

The storage and retrieval system moves orthogonally to the plane of the drawing in FIG. 3 and can bring a storage box 11 from any storage location, e.g., the shelf system 5.1, to the storage location LP 4.2 of the changing cubicle UK2. FIG. 3 shows a flap 15, which can close or open the opening 3 in the wall 1.

A storage box 11 in the aisle 13 between the two storage areas 5.1 and 5.2 is shown as an example.

No persons are allowed to be in the aisle 13, since the storage and retrieval system and the storage boxes 11 are moved back and forth there. Maintenance personnel may enter aisle 13 only for maintenance or repair purposes, when the storage and retrieval system is out of operation.

FIG. 3 clearly shows that the intermediate ceiling 7 is interrupted above the aisle 13, so that it is possible to transport storage boxes 11 vertically upwards from the aisle 13 and transfer them to the horizontal conveyor device 9.

FIG. 3 does not show the details of the transfer of a storage box 11 from the storage and retrieval system to the horizontal conveyor device 9. Solutions familiar from goods logistics can be used for this purpose.

Figure 4:
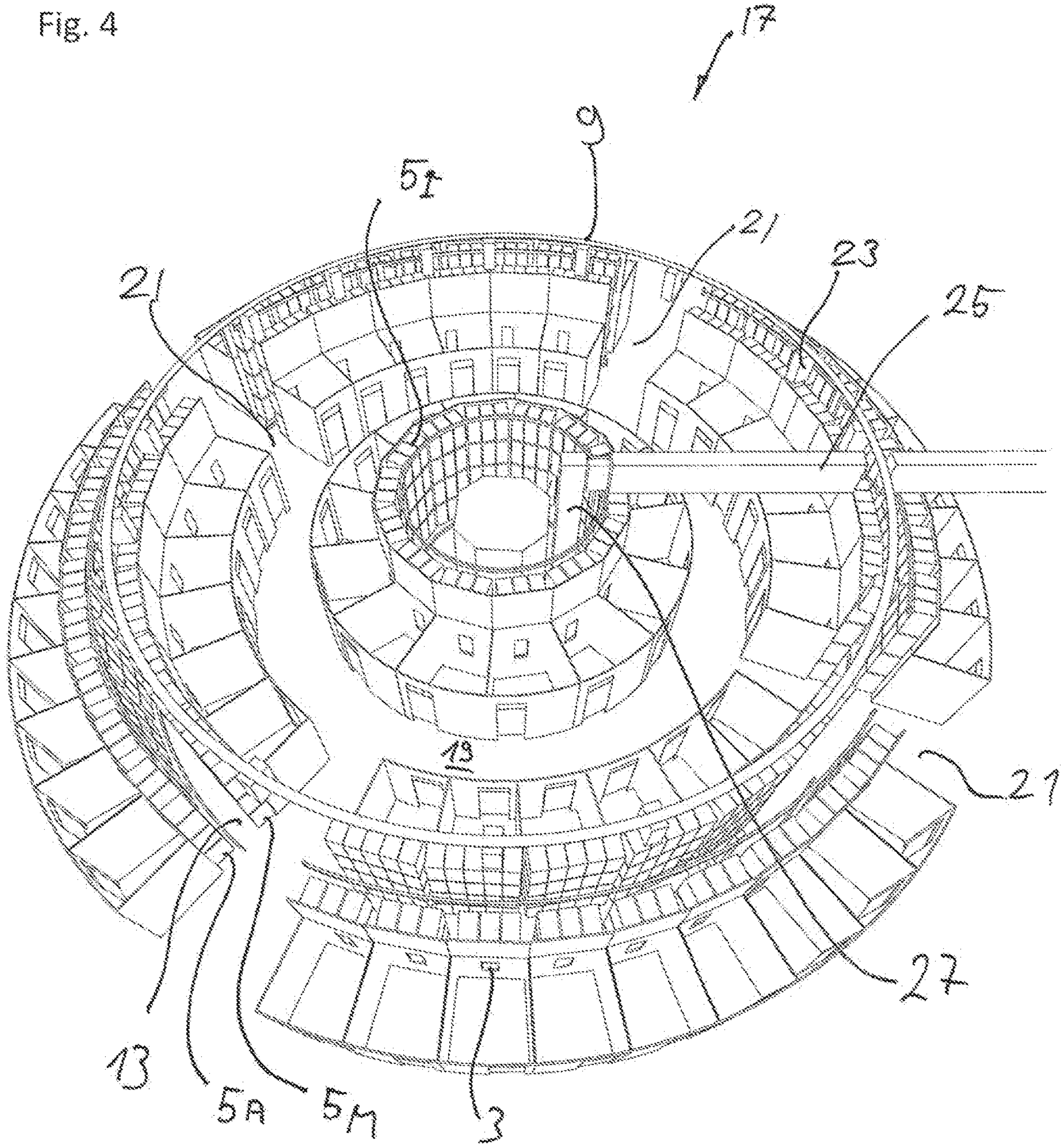
FIG. 4 shows an isometric view of a changing area with changing cubicles according to the invention.

FIG. 4 shows an isometric view of a first exemplary embodiment of a changing area 17. The changing cubicles are ultimately arranged on three different diameters. In the center of the changing area 17, a total of fourteen changing cubicles (without reference signs) are arranged in the shape of a circle. The changing cubicles have an approximately trapezoidal floor plan. The walls 1 with the openings 3 of these changing cubicles are arranged on the inside diameter of these changing cubicles. Accordingly, the shelf systems, which are each provided on the outside of wall 1, are arranged inside the circularly-arranged changing cubicles. A first storage and retrieval system 22, not visible in FIG. 4, is located inside these shelf systems 5.

The diameter on which the fourteen changing cubicles are arranged in a circle is referred to as the inner diameter.

The doors of these changing cubicles are arranged radially on the outside of these changing cubicles.

Visitors to a spa can reach the doors of the changing cubicles via a circular corridor 19 and radially-arranged corridors 21.

Outside of corridor 19, a total of four groups of changing cubicles are arranged in the shape of a circular arc. The diameter on which these changing cubicles are located is referred to as the middle diameter.

The doors of these cubicles open radially inwards towards the circular corridor 19. This means that the associated shelf systems are arranged radially on the outside of the changing cubicles arranged on the middle diameter. One of these shelf systems is labeled 5 m (m stands for middle diameter).

The changing cubicles arranged on the middle diameter m cannot be arranged as a closed circle, since otherwise access to the corridor 19 via the radially-running corridors 21 would not be possible.

Outside the circular arcs with changing cubicles arranged on the central diameter, there are further changing cubicles that are arranged on an outer diameter. These are arranged concentrically to the circular arcs arranged further inwards or the circularly-arranged changing cubicles inside the changing area.

Here, the doors of the changing cubicles arranged on the outer diameter are oriented radially outwards. The shelf systems 5A are accordingly aligned radially inwards, so that the shelf systems 5M and 5A delimit the aisle 13, as shown in FIG. 3. Accordingly, in this exemplary embodiment, there are a total of four curved aisles 13, each of which approximately covers an angle of 90°.

In this exemplary embodiment, in each aisle 13, there is arranged a second storage and retrieval system 23, not visible in FIG. 4. The storage and retrieval systems 23 can be moved in the aisle 13 within a segment and also in their height, so that they can reach every storage location of the storage and retrieval systems 5M and 5A. The second storage and retrieval systems 23 are not to cross the radial corridors 21 for reasons of user-friendliness, convenience, and to avoid accidents with the users of the changing area. This means that the travel path of the storage and retrieval systems 23 is limited to movements within the aisle 13.

FIG. 4 shows a horizontal conveyor device 9 as well as part of a radial transport device 25 and optional vertical conveyor device 27.

Figure 5:
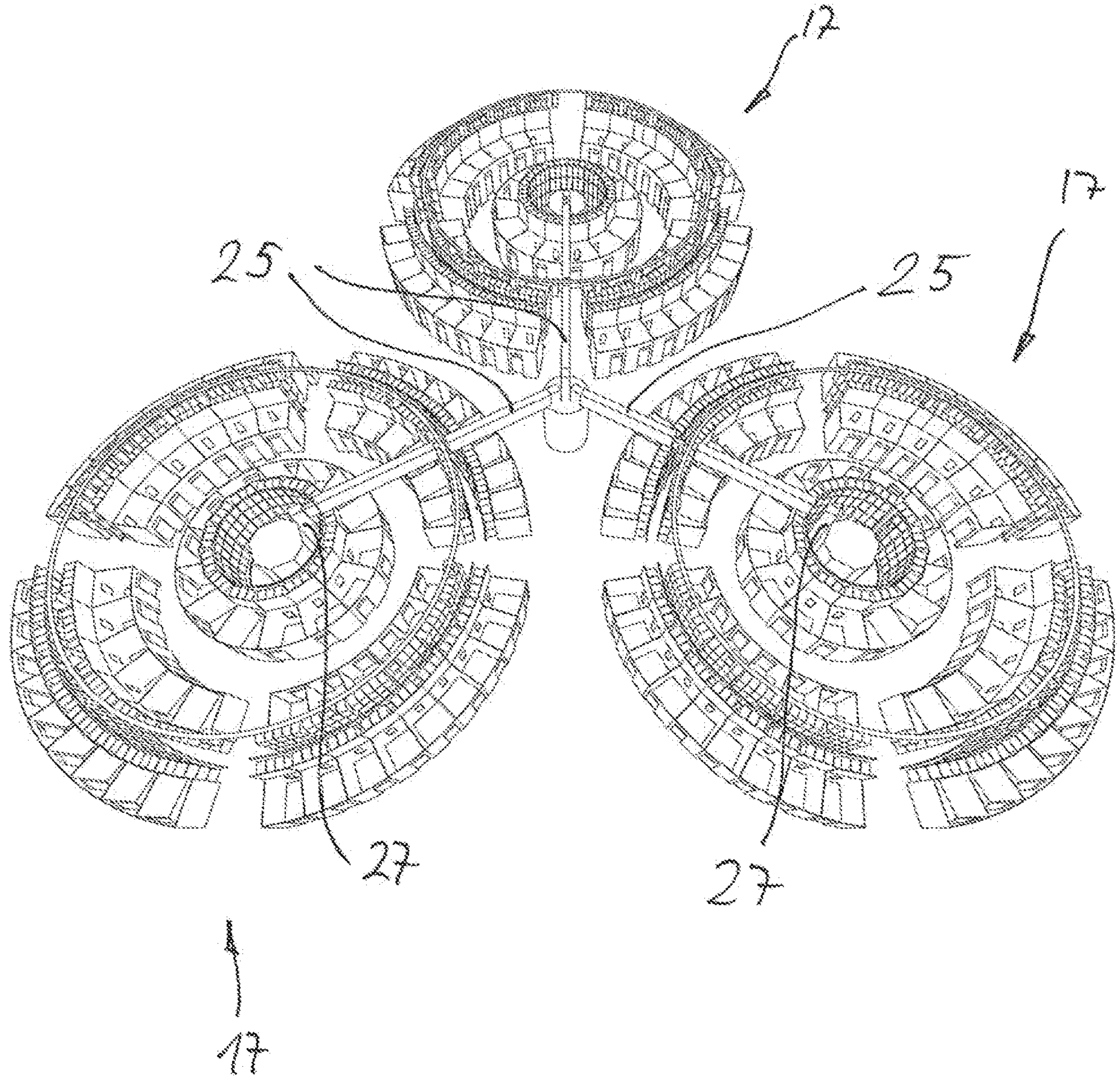
FIG. 5 shows a further isometric view of a second exemplary embodiment.

In FIG. 5, a further exemplary embodiment is now shown, also in an isometric view. In this exemplary embodiment, three changing areas as shown in FIG. 4 are arranged next to each other on one level. The changing areas 18 are connected to one another via radial transport devices 25. The radial transport devices 25 meet in a center. Vertical conveying devices 27 are optionally provided at the ends of the radial transport devices 25. In embodiments in which several changing areas are arranged one over the other (see, for example, FIG. 9), these vertical conveyor devices 27 connect them to one another.

The horizontal conveyor devices 9 can be seen in FIG. 5. They run via the aisles 13 and transport storage boxes 11 between the segments within a changing area. The horizontal conveyors 9 and the radial transport devices 25 are configured so that storage boxes 11 can be exchanged between them. This makes it possible, for example, to transport a storage box which is located in the storage area 51 inside a changing area into the aisle 13 between shelf systems 5M and 5A, and, there, to transport it to any free storage location in shelf systems 5M and 5A with the aid of a second storage and retrieval system.

Figure 6:
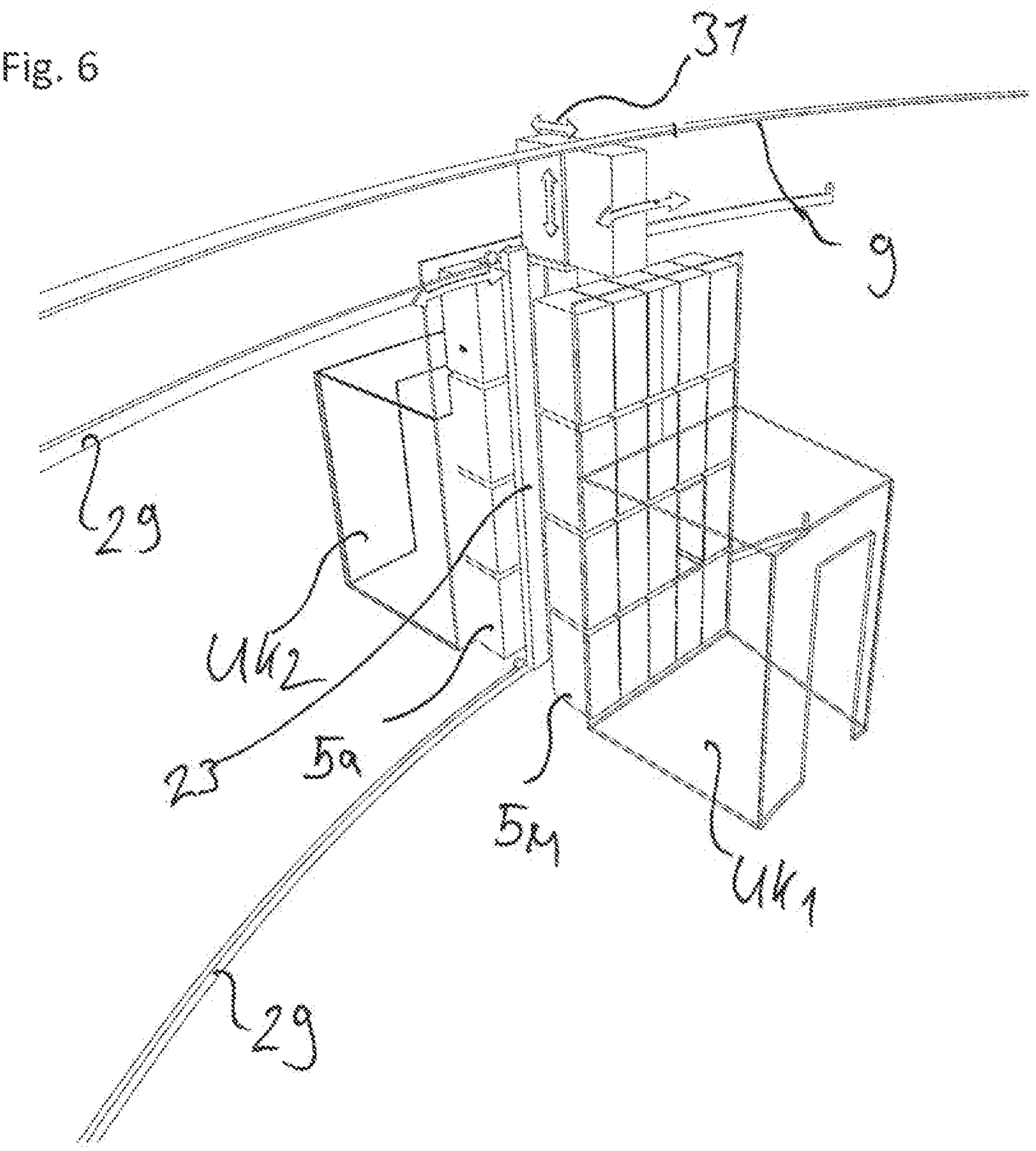
FIG. 6 shows a cutout of two changing cubicles, shelf systems, a storage and retrieval system, and a horizontal conveyor device.

FIG. 6 shows a first exemplary embodiment of a storage and retrieval system 23 in cooperation with a horizontal conveyor device 9. The second storage and retrieval system 23 is guided on rails 29 at the bottom and at the upper end of the shelf system (H=HLR). It can travel in the vertical direction (indicated by a vertically-oriented double arrow) and on a circular path (indicated by a curved double arrow) within a segment and can reach any storage location within a segment. The second storage and retrieval system 23 can remove a storage box 11 from a storage location or place it there. When the second storage and retrieval system 23 is moved all the way to the top, as shown in FIG. 6, it is then located above the intermediate ceiling 7 (see FIG. 3) and in the transport level. There, it can pick up a storage box 11 from the horizontal conveyor device 9, or deliver the box to this device. For this purpose, the second storage and retrieval system 23 makes, as required, a movement in the radial direction, as indicated by an arrow 31.

Figure 7:
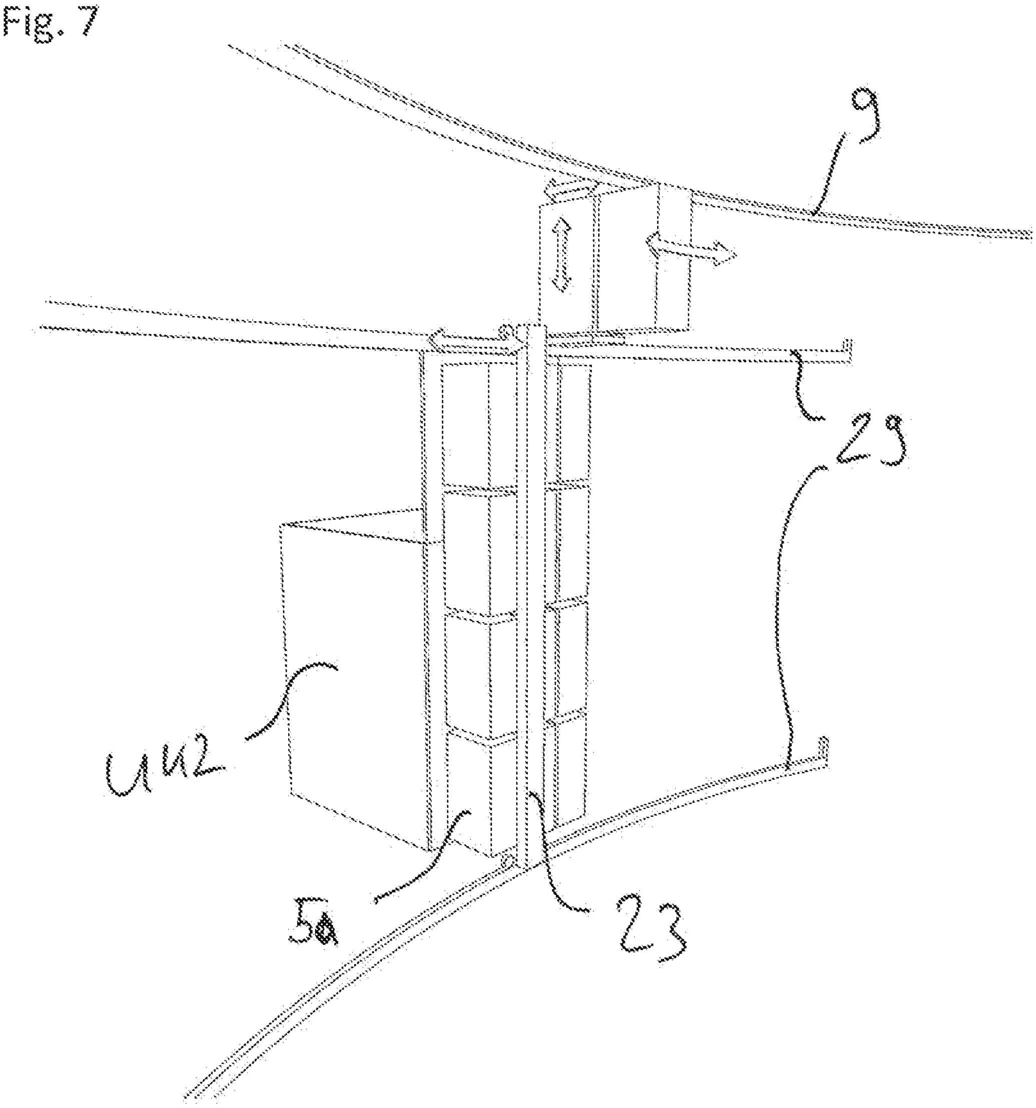
FIG. 7 shows a further cutout of a changing area with a shelf system, a storage and retrieval system, and the transfer to a horizontal conveyor device.

FIG. 7 shows the inner storage and retrieval system 22, which is provided in the center of a changing area 17 and transports the storage boxes 11 to the changing cubicles that form the inner circle.

Figure 8:
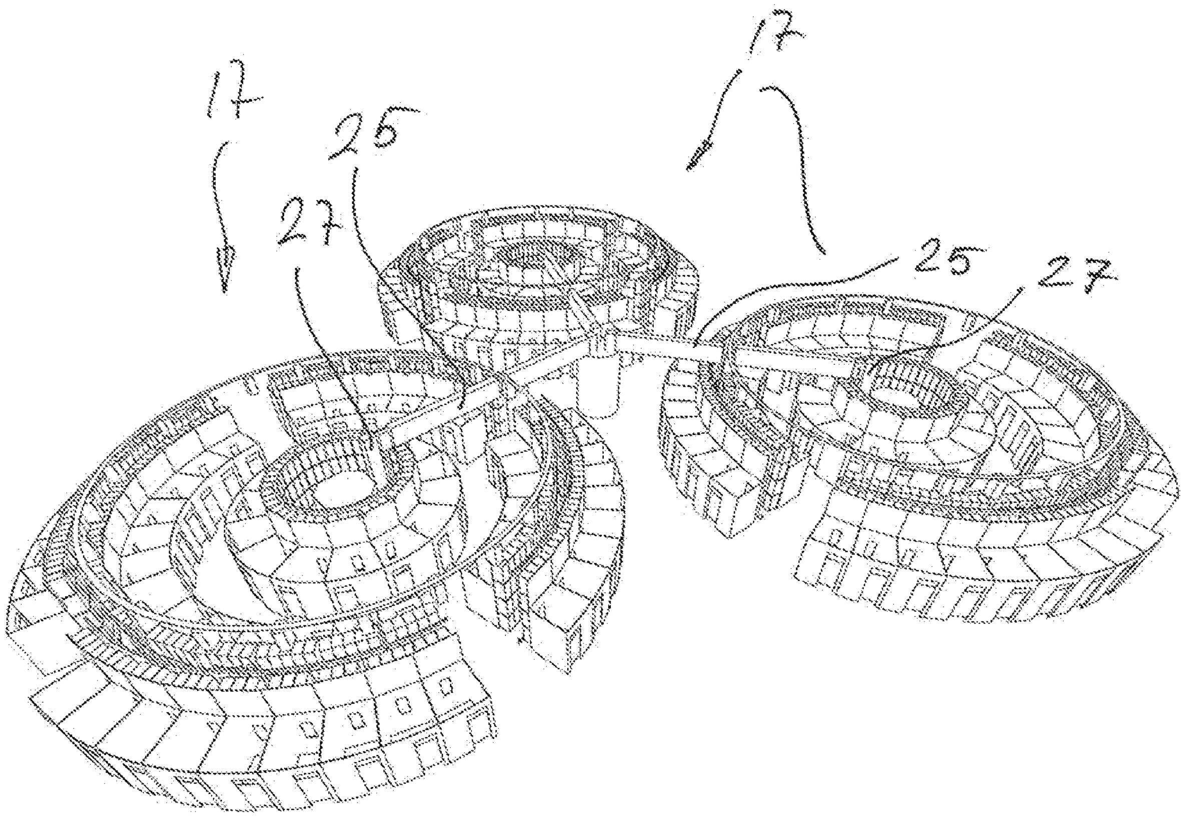
FIG. 8 shows an isometric view with additional radial transport devices.

FIG. 8 shows the exemplary embodiment shown in FIG. 5 from a different perspective.

Figure 9:
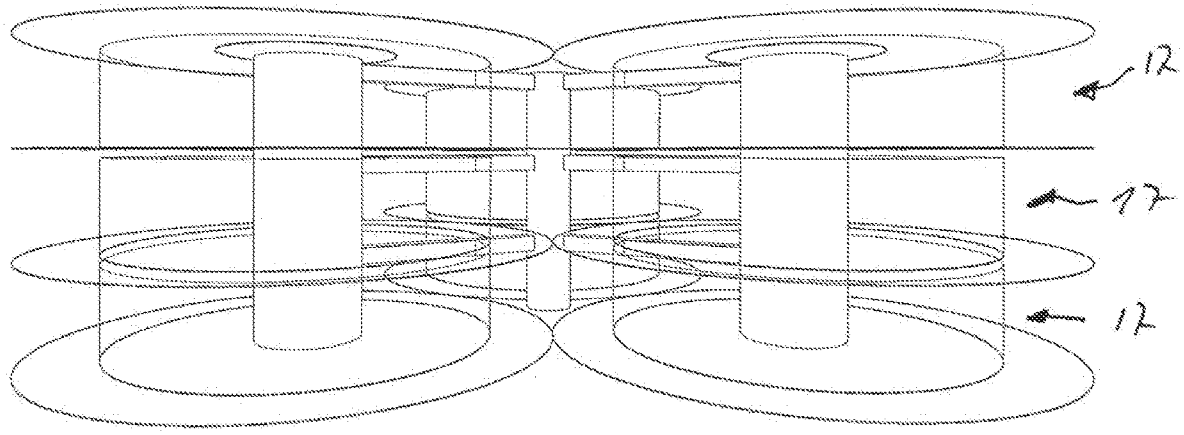
FIG. 9 shows an isometric view of a further exemplary embodiment with three changing areas arranged one above the other.

FIG. 9 shows a further exemplary embodiment in which nine (three times three) changing areas are combined to form a three-story changing area. The storage boxes are transported between the different levels via vertical conveyor devices 27. The transfer of the storage boxes 11 between a vertical conveyor device 27 and a radial transport device 25 can take place in the same way as the transfer between a storage and retrieval system 22, 23 and a horizontal conveyor device 9.

FIGS. 10 through 14 show further exemplary embodiments of changing areas according to the invention. They are based upon the same changing cubicles as the first exemplary embodiment. The functions of the storage and retrieval systems 22, 23, the horizontal conveyor device 9, the optional radial transport device(s) 25, and the optional vertical conveyor device(s) 27 are also identical.

Figure 10:
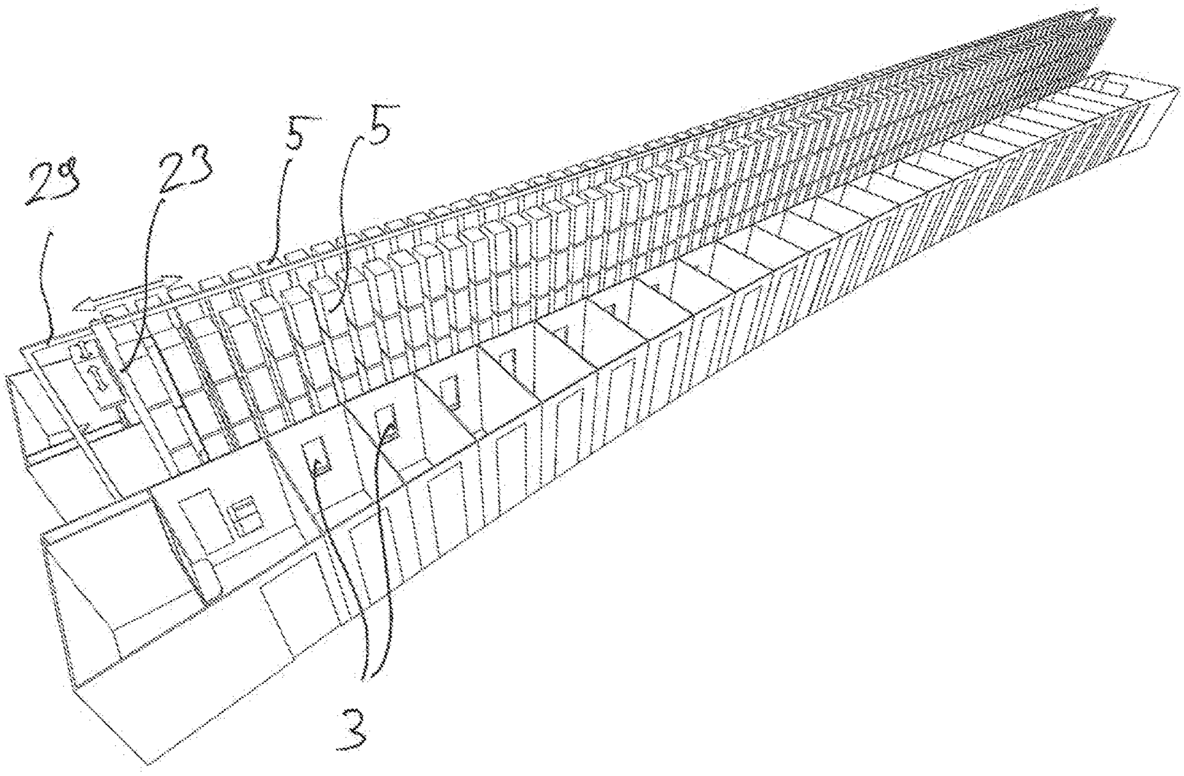
FIGS. 10 through 14 show isometric views of further exemplary embodiments of changing areas according to the invention.

In FIG. 10, two rows of changing cubicles with the opening 3 according to the invention and on the shelf systems 5 arranged on the outer wall are arranged "linearly" next to each other. They form a changing area 1. A storage and retrieval system 23 is arranged between them. The shelf systems 5 of the changing cubicles arranged next to one another merge into one another; they form a continuous, very long shelf system 5.

The rails 29 of the storage and retrieval system are generally straight and run parallel to the shelf systems 5.

At the beginning and end of a row of changing cubicles according to the invention, in this exemplary embodiment, rooms are provided which are larger than the "normal" changing cubicles. These can be changing cubicles for people with disabilities or recreation rooms for employees.

Figure 11:
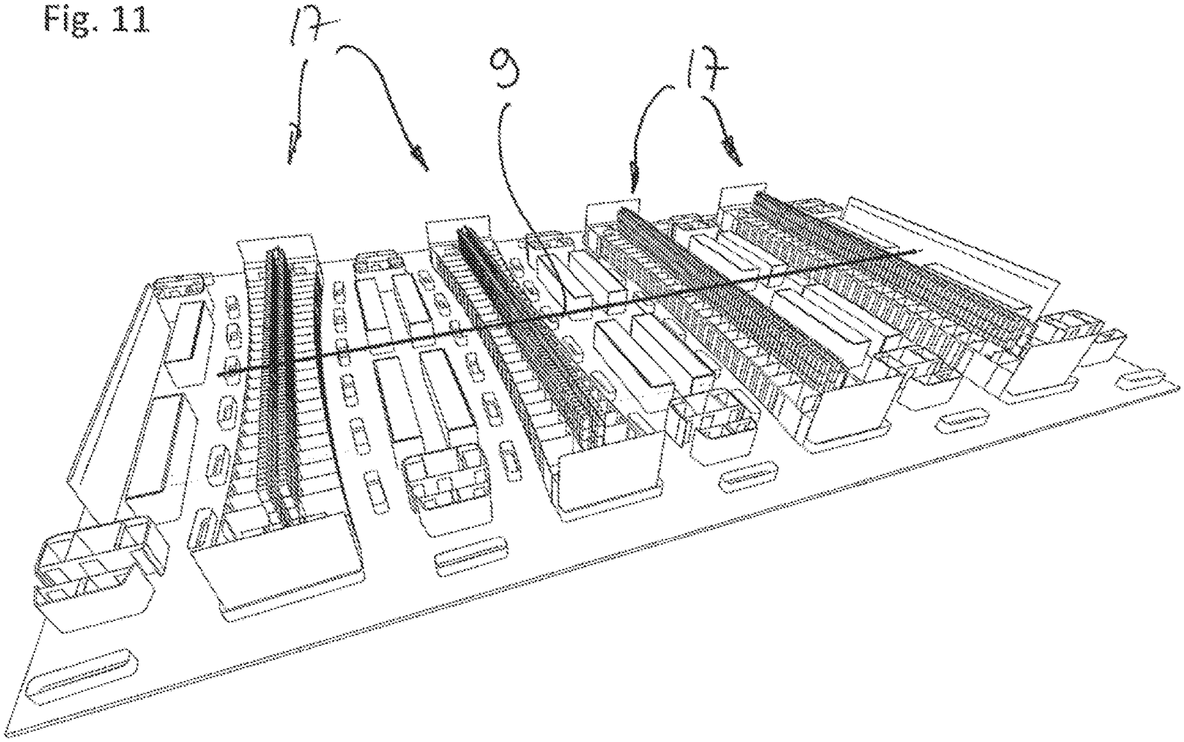

In FIG. 11, four "linear" changing areas 17 are arranged next to each other. Between the changing areas 17, there are generously sized and furnished lounge areas. The storage boxes 11 are transported between the changing areas 17 by means of one or more horizontal conveyor devices 9 or a radial transport device 25. The designation, "radial transport device," is somewhat surprising at first glance, given the linear arrangement of the changing cubicles; it is intended to make clear that it corresponds technically to the radial transport devices explained in connection with the first exemplary embodiment. As a rule, it is sufficient to install either one horizontal conveyor device 9 or one radial conveyor device 25. This simplifies the setup and shortens transport times.

Figure 12:
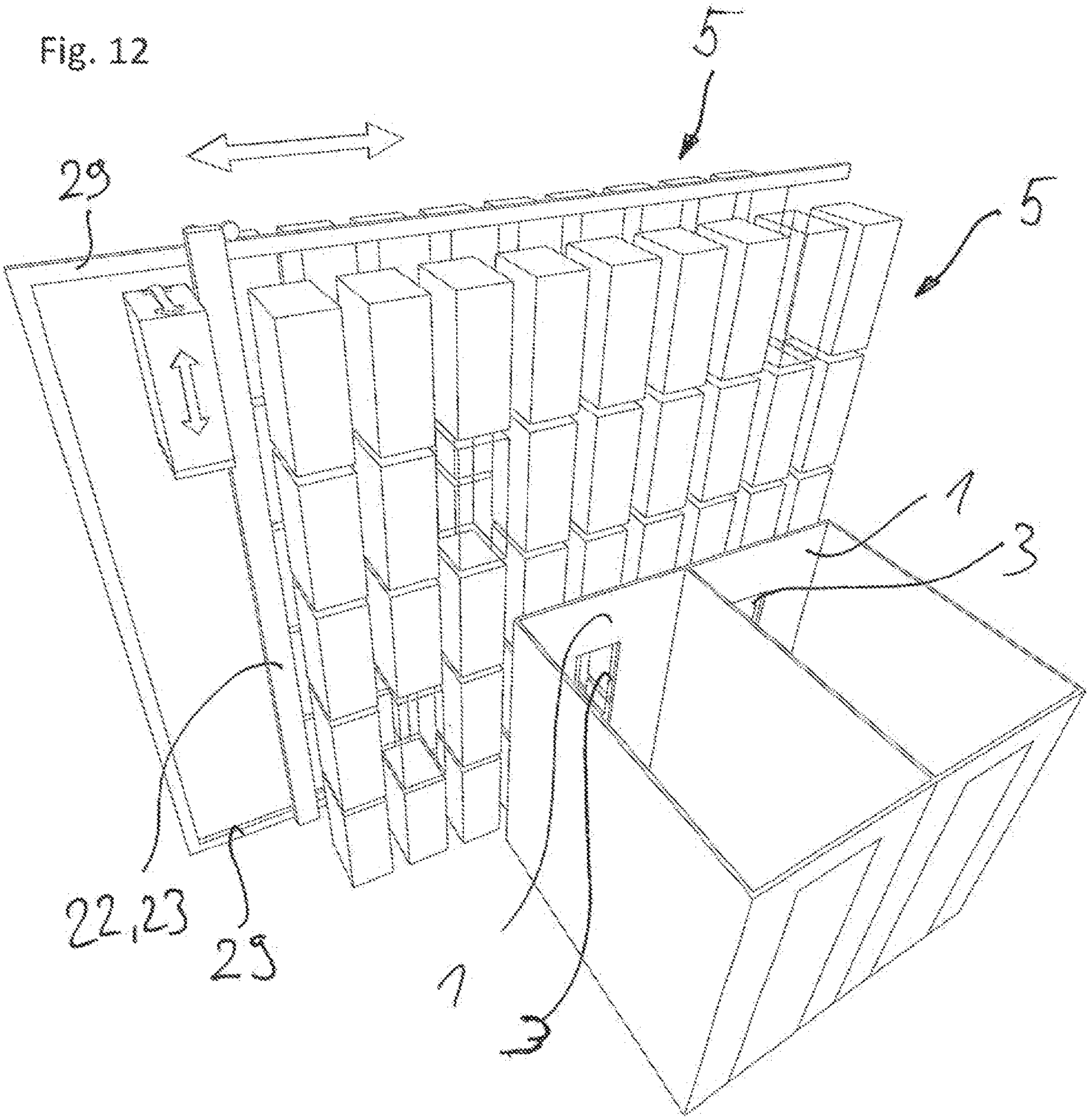
Figure 13:
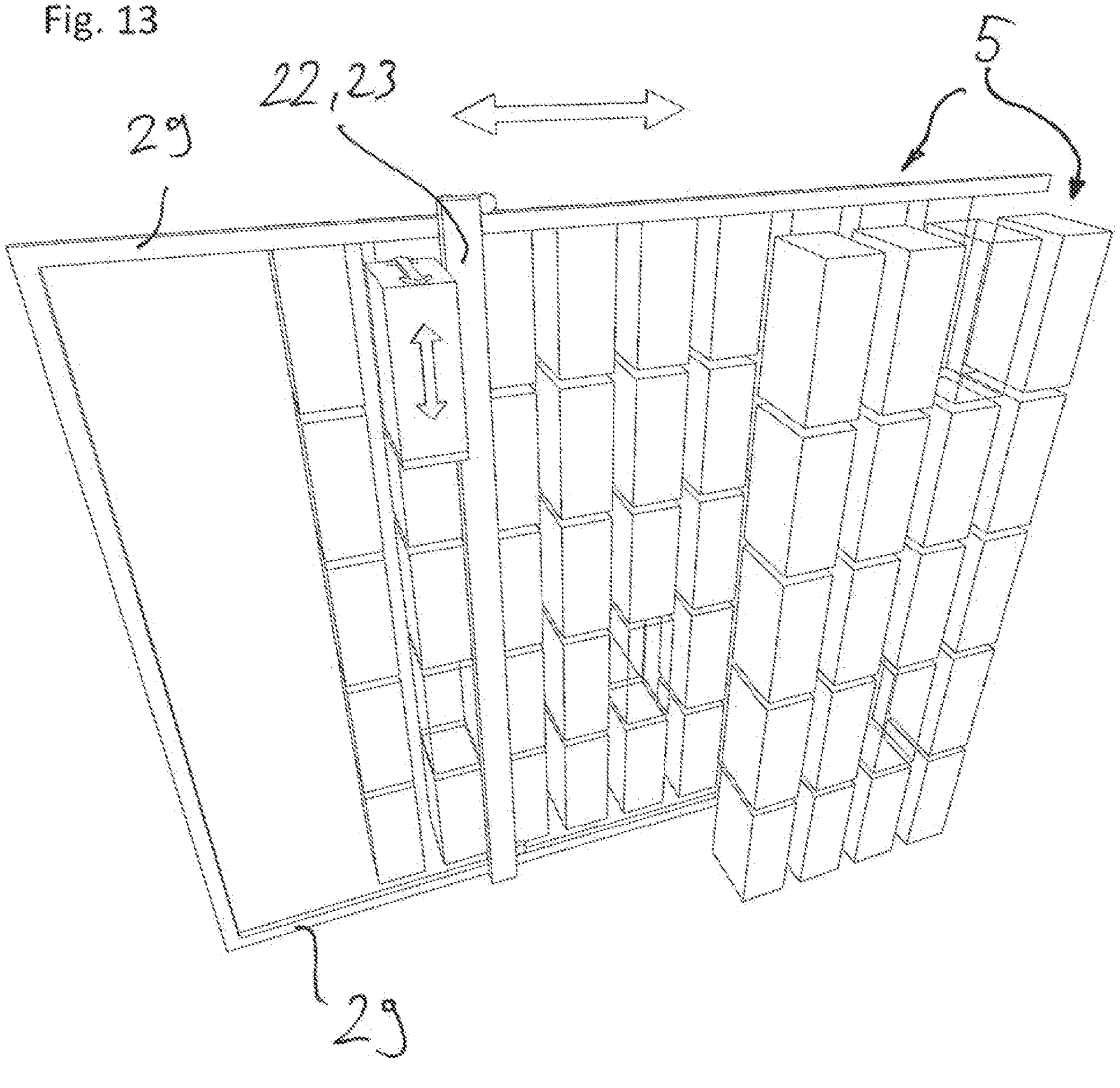

FIGS. 12 and 13 show cutouts of a changing area 17.

Figure 14:
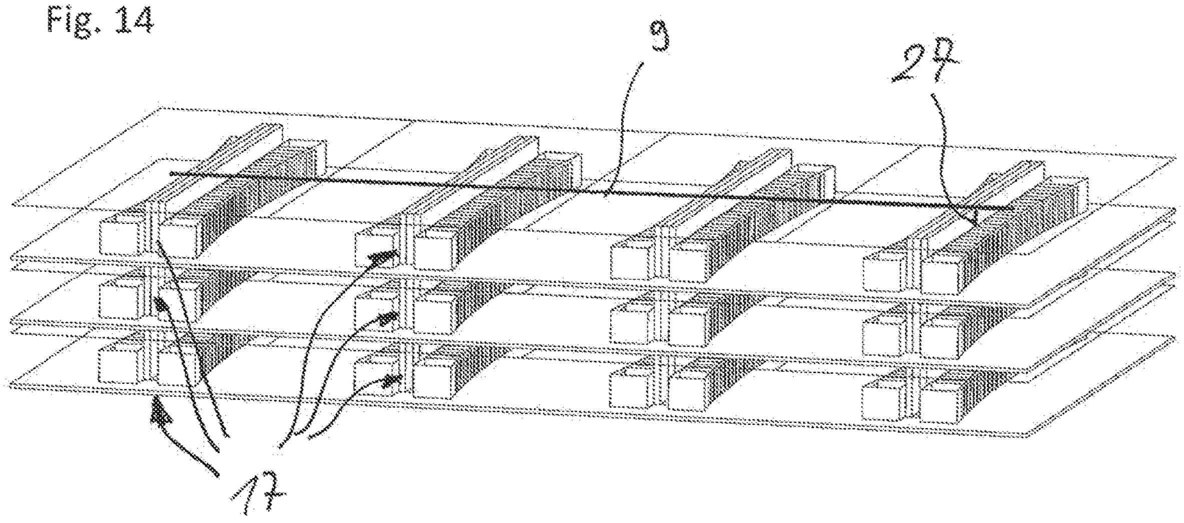

FIG. 14 shows twelve (three times four) changing areas 17 distributed over three levels. FIG. 14 is the equivalent of FIG. 9, with changing cubicles arranged in a circle. FIG. 14 shows a horizontal conveyor device 9 in a simplified view.

The storage boxes are transported between the three levels by one or more vertical conveyor devices 27; a small part of a vertical conveyor device 27 is shown in FIG. 14.

The transfer of the storage boxes 11 between a vertical conveyor device 27 and a horizontal conveyor device 9, or a radial transport device 25, can take place in the same way as the transfer between a storage and retrieval system 22, 23 and a horizontal conveyor device 9.

What is claimed is:

1. A changing area comprising several changing cubicles and at least one storage and retrieval system, wherein each changing cubicle comprises several walls and a door, wherein a shelf system for storage boxes is arranged on an outer side of a wall, wherein several storage locations for storage boxes are arranged side-by-side and one above the other in the shelf system and form a grid, wherein a wall of the changing cubicle has an opening, and wherein this opening exposes a storage location for a storage box, wherein the several changing cubicles comprise two changing cubicles having respective walls with respective openings aligned facing each other, so that two shelf systems are arranged between the respective walls of the two changing cubicles, and wherein an aisle is provided between the two shelf systems, the aisle being dimensioned so that the at least one storage and retrieval system and a storage box can travel back and forth in the aisle.

2. The changing area according to claim 1, characterized in that “m” storage locations are arranged next to one another in the shelf system, and “n” storage locations are arranged one above the other.

3. The changing area according to claim 1, characterized in that the several changing cubicles are arranged next to each other in a circle or in the form of a circular arc.

4. The changing area according to claim 3, characterized in that the changing cubicles are arranged in the shape of a circle, and several circular arcs are arranged concentrically thereto.

5. The changing area according to claim 4, characterized in that the changing area comprises several changing cubicles arranged on an inner circle having an inner diameter and several changing cubicles arranged on a middle circle, in that a corridor is formed between the changing cubicles arranged on the inner circle and the changing cubicles arranged on the middle diameter, and in that the doors of these changing cubicles are located on this corridor.

6. The changing area according to claim 5, characterized in that the changing area comprises further changing cubicles which are arranged on an outer circle, and in that the doors of the further changing cubicles are arranged radially on the outside.

7. The changing area according to claim 4, characterized in that a first storage and retrieval system is provided in the interior of the changing cubicles arranged on the one inner circle.

8. The changing area according to claim 6, characterized in that at least one second storage and retrieval system is provided between the shelf systems of the changing cubicles arranged on the middle diameter and between the shelf systems of the further changing cubicles arranged on the outer circle.

9. The changing area according to claim 8, characterized in that the number of the second storage and retrieval systems is at least as large as the number of the circular arcs in which the changing cubicles are arranged on the middle circle and/or the outer circle.

10. The changing area according to claim 1, characterized in that several changing cubicles are arranged in a row next to each other.

11. The changing area according to claim 10, characterized in that two rows of changing cubicles are arranged parallel to one another, in that two shelf systems are arranged between the two rows of changing cubicles, and in that a storage and retrieval system is provided between the shelf systems.

12. The changing area according to claim 1, characterized in that a horizontal conveyor device is arranged above and concentrically to the one or more second storage and retrieval systems, in that the horizontal conveyor device is movable on a closed track, and in that the horizontal conveyor device can accept a storage box from a second storage and retrieval system and can deliver a storage box to a second storage and retrieval system.

13. The changing area according to claim 1, characterized in that it comprises at least one radial transport device, and in that each radial transport device can accept one or more storage boxes from a storage and retrieval system and/or from a horizontal conveyor device and can deliver one or more storage boxes to another storage and retrieval system and/or to another horizontal conveyor device.

14. The changing area according to claim 1, characterized in that the changing area is one of two or three changing areas arranged next to each other on the same level, in that the two or three changing areas have one, two, or three radial transport devices, and in that storage boxes can be transported back and forth between the changing areas via the one, two, or three radial transport devices.

15. The changing area according to claim 1, characterized in that several changing areas are arranged one above the other on two or more levels, and at least one vertical conveying device is provided which connects the radial transport devices and/or the horizontal conveying devices of different levels with one another, so that storage boxes can be transported back and forth between different levels.

16. A method for operating a changing area comprising several changing cubicles and storage boxes and at least one storage and retrieval system, wherein each changing cubicle comprises several walls, wherein there is an opening in a wall of each changing cubicle, wherein the several changing cubicles comprise two changing cubicles having respective walls with respective openings aligned facing each other, so that two shelf systems are arranged between the respective walls of the two changing cubicles, wherein there is an aisle between the two shelf systems, which is dimensioned so that the storage and retrieval system and a storage box can travel back and forth in the aisle, and wherein the dimensions of the opening and the dimensions of the storage boxes are matched to one another in such a way that a storage box located in the opening can be loaded and emptied from the changing cubicle, the method comprising the following method steps:

selecting a changing cubicle by a user; and transporting a storage box assigned to the user into the opening of the changing cubicle selected by the user.

17. The method according to claim 16, characterized in that the storage box assigned to the user is removed from the opening of the changing cubicle selected by the user and stored in a free storage location of a shelf system as soon as the user frees the changing cubicle selected by the user.

18. The method according to claim 16, characterized in that a storage box is assigned to the user at the latest when the user selects a changing cubicle for the first time.

19. The method according to claim 16, characterized in that the assignment of a storage box to a user continues until the user leaves the facility to which the changing area belongs.

20. The method according to claim 16, characterized in that the assignments of a storage box to a user are stored after the assignment has been canceled.

* * * * *